United States Patent
Choi et al.

(10) Patent No.: US 11,651,214 B2
(45) Date of Patent: May 16, 2023

(54) MULTIMODAL DATA LEARNING METHOD AND DEVICE

(71) Applicants: SAMSUNG ELECTRONICS CO., LTD., Suwon-si (KR); KOREA ADVANCED INSTITUTE OF SCIENCE AND TECHNOLOGY, Daejeon (KR)

(72) Inventors: Hyun Soo Choi, Suwon-si (KR); Chang D. Yoo, Daejeon (KR); Sung Hun Kang, Daejeon (KR); Jun Yeong Kim, Daejeon (KR); Sung Jin Kim, Suwon-si (KR)

(73) Assignees: SAMSUNG ELECTRONICS CO., LTD., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 497 days.

(21) Appl. No.: 16/764,677

(22) PCT Filed: Nov. 13, 2018

(86) PCT No.: PCT/KR2018/013824
§ 371 (c)(1),
(2) Date: May 15, 2020

(87) PCT Pub. No.: WO2019/098644
PCT Pub. Date: May 23, 2019

(65) Prior Publication Data
US 2020/0410338 A1    Dec. 31, 2020

(30) Foreign Application Priority Data

Nov. 17, 2017  (KR) .................. 10-2017-0153972
Mar. 13, 2018  (KR) .................. 10-2018-0029403

(51) Int. Cl.
*G06N 3/08*   (2023.01)
*G06N 20/20*  (2019.01)
(Continued)

(52) U.S. Cl.
CPC ............. *G06N 3/08* (2013.01); *G06F 18/217* (2023.01); *G06N 3/045* (2023.01); *G06N 20/20* (2019.01)

(58) Field of Classification Search
None
See application file for complete search history.

(56) References Cited

U.S. PATENT DOCUMENTS 8,838,446 B2   9/2014  Jeong et al.
8,861,805 B2  10/2014  Hwang et al.
(Continued)

FOREIGN PATENT DOCUMENTS

KR   1020080056069 A   6/2008
KR      101219469 B1   1/2013
(Continued)

OTHER PUBLICATIONS

International Search Report (PCT/ISA/210) and Translation of Written Opinion (PCT/ISA/237) dated Feb. 15, 2019 issued from the International Searching Authority in counterpart application No. PCT/KR2018/013824.
(Continued)

*Primary Examiner* — Alan Chen
(74) *Attorney, Agent, or Firm* — Sughrue Mion, PLLC

(57) ABSTRACT

An artificial intelligence (AI) system capable of simulating functions of a human brain, such as recognition and judgment, by using the machine learning algorithm such as deep learning, and an application thereof are provided. A method of learning multi-modal data according to the AI system and an application thereof includes: obtaining first context infor-
(Continued)

mation representing a characteristic of a first signal and second context information representing a characteristic of a second signal by using a first learning network model; obtaining hidden layer information based on the first context information and the second context information by using a second learning network model; obtaining a correlation value representing a relation degree between the hidden layer information by using the second learning network model; and learning the hidden layer information in which the correlation value is derived as a maximum value.

11 Claims, 11 Drawing Sheets

(51) Int. Cl.
*G06F 18/21* (2023.01)
*G06N 3/045* (2023.01)

(56) References Cited

U.S. PATENT DOCUMENTS

2012/0303565 A1 11/2012 Deng et al.
2014/0279777 A1 9/2014 Cornebise et al.
2017/0228642 A1 8/2017 Danihelka et al.
2019/0188567 A1* 6/2019 Yao .......................... G06N 3/04

FOREIGN PATENT DOCUMENTS

| KR | 10-2013-0048076 A | 5/2013 |
| KR | 101646926 B1 | 8/2016 |
| KR | 1020170098573 A | 8/2017 |
| WO | 2014200155 A1 | 12/2014 |

OTHER PUBLICATIONS

Yang, X., et al., "Deep Multimodal Representation Learning from Temporal Data", arXiv:1704.03152v1 [cs.CV], Apr. 11, 2017, 9 pages.
Communication dated Oct. 27, 2021 by the Korean Intellectual Property Office in Korean Patent Application No. 10-2018-0029403.
Communication dated Jan. 12, 2022 by the Korean Intellectual Property Office in Korean Patent Application No. 10-2018-0029403.

* cited by examiner

| Model | acc@top1 (233 Classes) | acc@top5 (233 Classes) |
|---|---|---|
| Baseline | 64.1% | 86.8% |
| CM Joint | 68.5% | 89% |
| Context Flow Control | 64.5% | 88.5% |
| Overall Framework | 69.0% | 89.7% |

| Model | acc@top1 (233 Classes) | acc@top5 (233 Classes) |
|---|---|---|
| Baseline | 64.1% | 86.8% |
| Corr_Hidden | 71.79% | 90.78% |
| Corr_Logit | 71.64% | 90.55% |
| Corr_HiddenLogit | 71.80% | 90.79% |

FIG. 13

| Model | acc@top1 (233 Classes) | acc@top5 (233 Classes) |
|---|---|---|
| Without cGRU | 71.80% | 90.79% |
| With cGRU (Contextual Modeling) | 73.92% | 92.02% |

FIG. 14

| Model | Corr | Aggregation | Sequential Model | acc@top1 (233 Classes) | acc@top5 (233 Classes) |
|---|---|---|---|---|---|
| Baseline | X | X | LSTM | 64.1% | 86.8% |
| Corr_Base | X | X | LSTM | 66.29% | 88.04% |
| Corr_Hidden | Hidden | Mean | LSTM | 68.5% | 89% |
| Projective Aggregation | Hidden | Projective | LSTM | 70.47% | 89.5% |
| Adaptive Aggregation | Hidden | Adaptive | LSTM | 71.79% | 90.78% |
| Corr_Logit | Logit | Adaptive | LSTM | 71.64% | 90.55% |
| Corr_HiddenLogit | Hidden & Logit | Adaptive | LSTM | 71.78% | 90.79% |
| Final | Hidden & Logit | Adaptive | cGRU/GRU | 73.92% | 92.02% |

MULTIMODAL DATA LEARNING METHOD AND DEVICE

CROSS-REFERENCE TO RELATED APPLICATIONS

This application is a National Stage of International Application No. PCT/KR2018/013824 filed Nov. 13, 2018, claiming priority based on Korean Patent Application No. 10-2017-0153972, filed Nov. 17, 2017, and Korean Patent Application No. 10-2018-0029403, filed Mar. 13, 2018, the contents of all of which are incorporated herein by reference in their entirety.

TECHNICAL FIELD

The disclosure relates to methods and apparatuses for learning multi-modal data, and non-transitory recording media having recorded thereon a program performing the method of learning multi-modal data.

BACKGROUND ART

An artificial intelligence (AI) system is a computer system configured to realize human level, intelligence. Unlike a rule-based smart system according to the related art, the AI system is a system in which a machine trains itself and makes determinations spontaneously to become smarter. Since a recognition rate of the AI system improves and the AI system more accurately understands a users taste as it is increasingly used, the rule-based smart system is gradually being replaced by a deep learning-based AI system.

AI technology includes machine learning (deep learning) and element technologies utilizing the machine learning.

The machine learning is algorithm technology which self-classifies and learns characteristics of input data, and the element technology is technology for simulating functions of a human brain, such as recognition and judgment, by using a machine learning algorithm such as deep learning. The element technology includes technical fields such as linguistic understanding, visual understanding, deduction/prediction, knowledge representation, and operation control.

Various fields to which the AI technology is applied are as follows. The linguistic understanding is technology of recognizing human languages/characters and applying/processing the same, and includes natural language processing, machine translation, a conversation system, questions and answers, and voice recognition/synthesis. The visual understanding is technology of recognizing an object and processing the same like in human vision, and includes object recognition, object tracing, image retrieval, person recognition, scene understanding, space understanding, and image improvement. The deduction/prediction is technology of determining information and logically deducing and predicting the same, and includes knowledge/probability-based deduction, optimized prediction, a preference-based plan, and recommendation. The knowledge representation is technology of automation-processing human experience information as knowledge data, and includes knowledge establishment (data generation/classification) and knowledge management (data utilization). The operation control is technology of controlling self-driving of an automobile and movements of a robot, and includes movement control (navigation, collision avoidance, and driving) and manipulation control (behavior control).

DESCRIPTION OF EMBODIMENTS

Technical Problem

Provided are methods and apparatuses for learning multi-modal data which resolve issues that main context information existing inside each domain cannot be extracted by using a method of calculating weights of a plurality of different domain signals, and an amount of operations of the number of correlations calculated between two domains increases to N (N−1)/2 in the case where the number of domains increases to N.

BRIEF DESCRIPTION OF DRAWINGS

FIG. 13 is a table comparing data accuracies of a case of using a cGRU according to an embodiment and a case of not using the cGRU; and FIG. 14 is a table comparing accuracy of data obtained by using a method of learning multi-modal data, according to an embodiment.

BEST MODE

Figure 1:
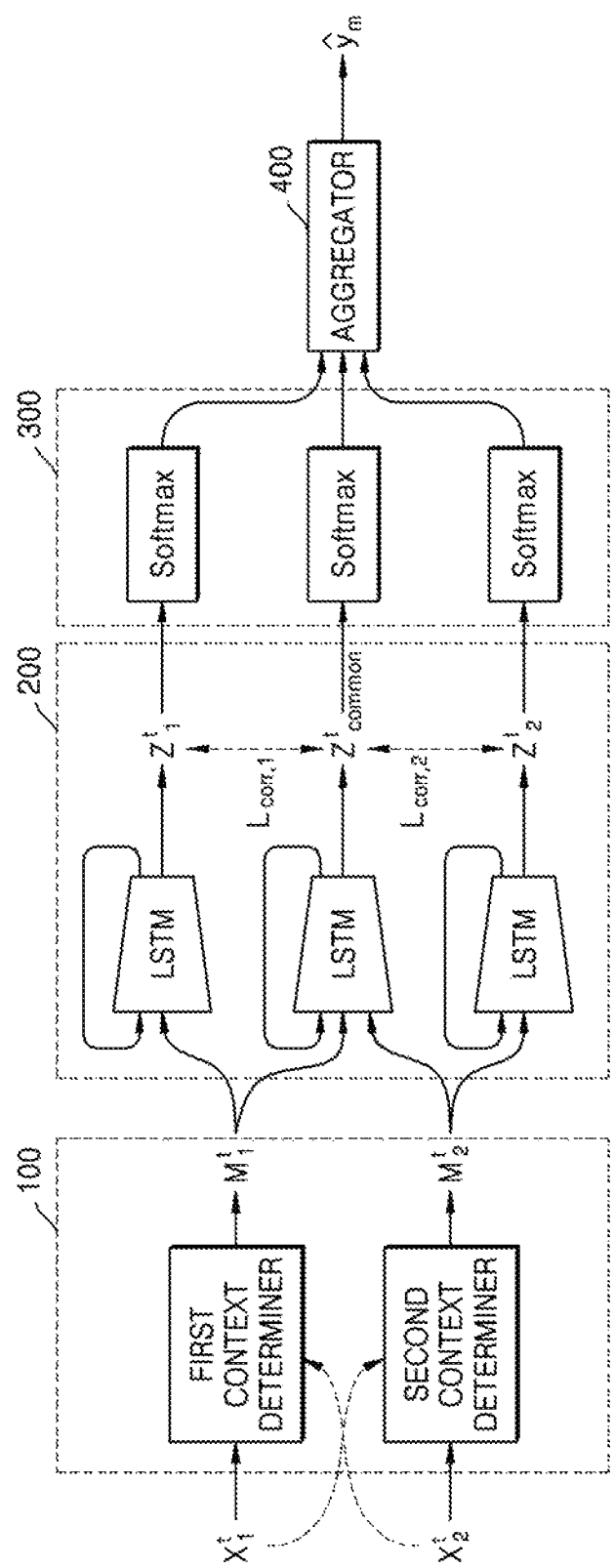
FIG. 1 is a conceptual view for explaining an apparatus for learning multi-modal data, according to an embodiment.

In accordance with an aspect of the disclosure, a method of learning multi-modal data includes: obtaining first context information representing a characteristic of a first signal and second context information representing a characteristic of a second signal by using a first learning network model; obtaining hidden layer information based on the first context information and the second context information by using a second learning network model; obtaining a correlation value representing a relation degree between the hidden layer information by using the second learning network model; and learning the hidden layer information in which the correlation value is derived as a maximum value.

The first signal and the second signal may respectively include different kinds of domain vectors, the first context information may be obtained by element-wise multiplying the domain vector of the first signal by a mask vector having the same size as that of the domain vector of the first signal, and the second context information may be obtained by element-wise multiplying the domain vector of the second signal by a mask vector having the same size as that of the domain vector of the second signal.

The second learning network model may use a long-short term memory (LSTM), and the obtained hidden layer information may include hidden layer information of the first signal, hidden layer information of the second signal, and common hidden layer information of the first signal and the second signal.

The learning of the hidden layer information may include repeating an operation of subtracting the correlation value from an objective function until the objective function has a minimum value.

The correlation value may include a first correlation value representing a relation degree between the hidden layer information of the first signal and the common hidden layer information of the first signal and the second signal, and a second correlation value representing a relation degree between the hidden layer information of the second signal and the common hidden layer information of the first signal and the second signal.

In accordance with another aspect of the disclosure, an apparatus for learning multi-modal data includes: a memory configured to store one or more instructions; and at least one processor configured to execute the one or more instructions stored in the memory to obtain first context information representing a characteristic of a first signal and second context information representing a characteristic of a second signal by using a first learning network model, obtain hidden layer information based on the first context information and the second context information by using a second learning network model, obtain a correlation value representing a relation degree between the hidden layer information by using the second learning network model, and learn the hidden layer information in which the correlation value is derived as a maximum value.

MODE OF DISCLOSURE

Terms used herein will be described in brief prior to a detailed description of the present disclosure.

As the terms used herein, so far as possible, widely-used general terms are selected in consideration of functions in the present disclosure; however, these terms may vary according to the intentions of those of ordinary skill in the art, the precedents, or the appearance of new technology. Also, in some cases, there may be terms that are arbitrarily selected by the applicant, and the meanings thereof will be described in detail in the corresponding portions of the description of the present disclosure. Therefore, the terms used herein are not simple titles of terms and should be defined based on the meanings thereof and the overall description of the present disclosure.

Though terms including an ordinal number such as a first and a second may be used for describing various elements, elements are not limited by the terms. The above terms are used only to distinguish one component from another. For example, a first element may be referred to as a second element, and similarly, the second element may be referred to as the first element without departing from the scope of the present disclosure. Terms "and/or" include a combination of a plurality of related items or one of the plurality of related items.

Throughout the specification, when a portion "includes" an element, another element may be further included, rather than excluding the existence of the other element, unless otherwise described. Also, a term "unit" used in the specification denotes a software and a hardware element such as a field-programmable gate array (FPGA) or an application specific integrated circuit (ASIC), and a "unit" performs certain roles. However, a "unit" is not limited to software or hardware. A "unit" may be configured to exist in a storage medium which may be addressed or may be configured to reproduce one or more processors. Therefore, as an example, a "unit" includes elements such as software elements, object-oriented software elements, class elements, and task elements, processes, functions, characteristics, procedures, sub-routines, segments of a program code, drivers, firmware, a micro code, a circuit, data, a database, data structures, tables, arrays, and variables. A function provided in elements and "units" may be coupled to a smaller number of elements and "units", or may be further separated as additional elements or "units".

Embodiments of the present disclosure are described below in detail with reference to the accompanying drawings to enable those of ordinary skill in the art to easily carry out the present disclosure. However, the present disclosure may be implemented in various different forms and is not limited to the embodiments described therein. Also, for clear description of the present disclosure, parts not related to the description have been omitted in the drawings, and like reference numerals are used for like elements throughout the specification.

The present disclosure provides a learning method which may be used for a task dealing large-scale multimedia data using a deep neural network in machine learning. Specifically, according to an embodiment, a task performance processing a plurality of signals having different kinds of domain vectors may improve.

The present specification describes a method and an apparatus for processing two signals having different kinds of domain vectors. Though description has been made to processing two signals, for convenience of description, it is obvious that the present disclosure may extend to a method and an apparatus for learning multi-modal data, processing N signals (N is an integer equal to or greater than 2).

FIG. 1 is a conceptual view for explaining an apparatus for learning multi-modal data according to an embodiment.

Referring to FIG. 1, the apparatus for learning multi-modal data (referred to as the apparatus) may include a first learning network model 100, a second learning network model 200, a classifier 300, and an aggregator 400.

The first learning network model 100 may include a first context determiner and a second context determiner. The first context determiner and the second context determiner may respectively receive different kinds of domain vector signals X1 and X2.

Each of the first and second context determiners may include a context flow control model. The first context determiner may obtain first context information M1 representing a characteristic of the signal X1.

The first context determiner may generate a domain vector of the received signal X1 and a mask vector having the same size as that of the domain vector of the signal X1, and obtain the first context information M1 by element-wise multiplying the domain vector of the signal X1 by the mask vector of the signal X1.

The second context determiner may obtain second context information M2 representing a characteristic of the signal X2.

The second context determiner may generate a domain vector of the received signal X2 and a mask vector having the same size as that of the domain vector of the signal X2, and obtain the second context information M2 by element-wise multiplying the domain vector of the signal X2 by the mask vector of the signal X2.

In an embodiment, context information may be determined as modality information determined as important information among modality information of a different kind of domain vector signal. The important information may be modality information of the time at which a change of a sequence signal constituting a different kind of domain vector signal is large.

The second learning network model 200 may include three long-short term memory (LSTM) networks.

The second learning network model 200 may receive the first context information M1 and the second context information M2 obtained from the first learning network model 100.

The second learning network model 200 may obtain hidden layer information Z1, Zcommon, and Z2 based on the first context information M1 and the second context information M2 received by using the LSTM network.

The second learning network model 200 may obtain the hidden layer information Z1 based on the first context information M1 by using the LSTM network.

The second learning network model 200 may obtain the hidden layer information Z2 based on the second context information M2 by using the LSTM network.

The second learning network model 200 may obtain the common hidden layer information Zcommon based on the first context information M1 and the second context information M2 by using the LSTM network.

The second learning network model 200 may obtain a correlation value representing a relation degree between obtained hidden layer information.

The second learning network model 200 may obtain a correlation value between the hidden layer information Z1 and the common hidden layer information Zcommon. The second learning network model 200 may obtain a correlation value between the hidden layer information Z2 and the common hidden layer information Zcommon.

The second learning network model 200 may learn hidden layer information in which a correlation value is derived as a maximum value.

The second learning network model 200 may learn hidden layer information in which a correlation value is derived as a maximum value by repeating an operation of subtracting the correlation value from an objective function until the objective function of a softmax has a minimum value.

In an embodiment, the second learning network model 200 may minimize a final objective function in which a correlation value has been subtracted from the objective function of the softmax. The second learning network model 200 may learn the hidden layer information in which the correlation value is derived as a maximum value by minimizing the final objective function.

The classifier 300 may include three softmaxes.

The softmax may be mapped to a matched class by receiving each hidden layer information. In an embodiment, the second learning network model 200 may add correlation between result values predicted by a classifier such as the softmax to the objective function and perform learning, which will be described in detail in a description part of FIG. 10.

The aggregator 400 may aggregate mapped classes to finally determine a class Ym of a different kind of domain vector signal.

Figure 2:
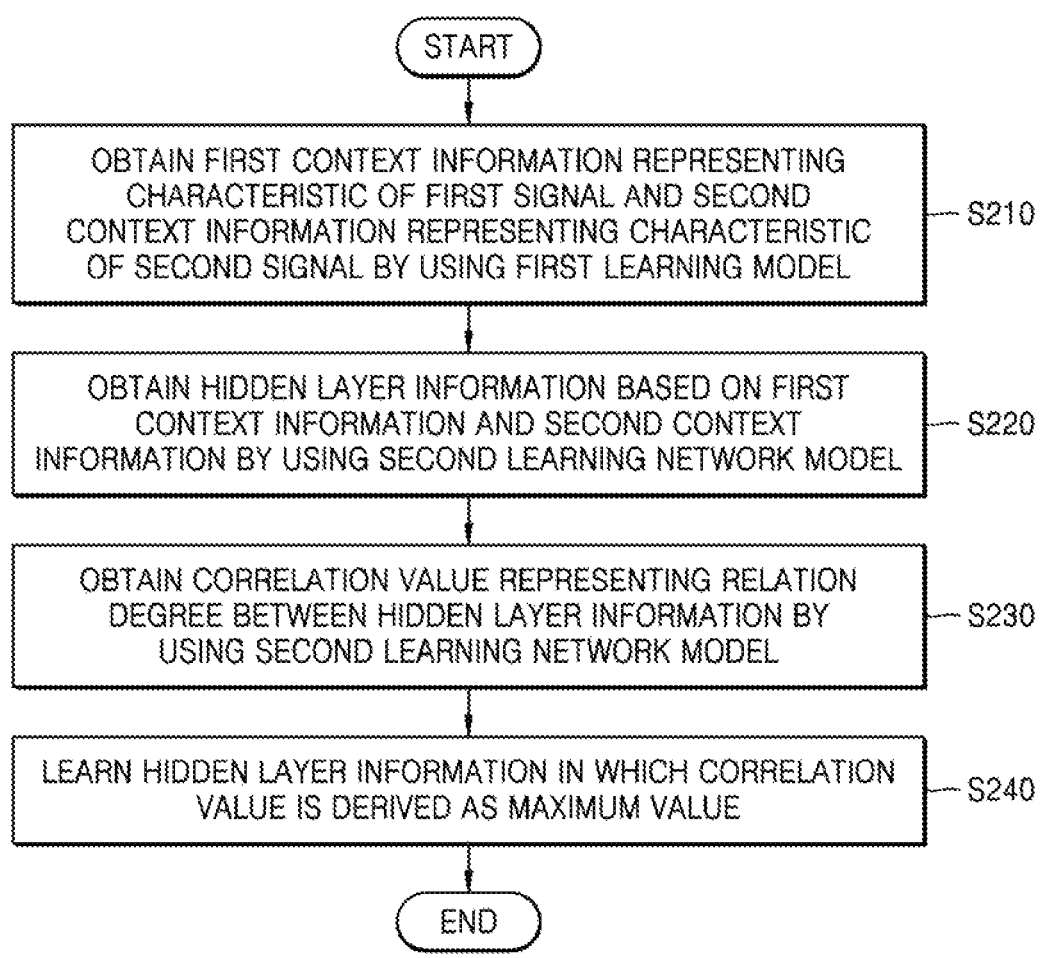
FIG. 2 is a flowchart for explaining a method of learning multi-modal data, according to an embodiment.

FIG. 2 is a flowchart for explaining a method of learning multi-modal data according to an embodiment.

In operation S210, the apparatus may obtain the first context information representing a characteristic of a first signal and the second context information representing a characteristic of a second signal by using the first learning network model.

In an embodiment, the first signal and the second signal may respectively include different kinds of domain vectors. The first context information may be obtained by element-wise multiplying a domain vector of the first signal by a mask vector having the same size as that of the domain vector of the first signal. The second context information may be obtained by element-wise multiplying a domain vector of the second signal by a mask vector having the same size as that of the domain vector of the second signal.

In operation S220, the apparatus may obtain hidden layer information based on the first context information and the second context information by using the second learning network model.

In an embodiment, the second learning network model may use the LSTM. The obtained hidden layer information may include hidden layer information of the first signal, hidden layer information of the second signal, and common hidden layer information of the first and second signals.

In operation S230, the apparatus may obtain a correlation value representing a relation degree between hidden layer information by using the second learning network model.

In an embodiment, the correlation value may include a first correlation value representing a relation degree between hidden layer information of the first signal and common hidden layer information of the first and second signals, and a second correlation value representing a relation degree between hidden layer information of the second signal and common hidden layer information of the first and second signals.

In operation S240, the apparatus may learn hidden layer information in which the correlation value is derived as a maximum value.

In an embodiment, the apparatus may learn hidden layer information by repeating an operation of subtracting the correlation value from an objective function until the objective function of a softmax has a minimum value.

In an embodiment, the apparatus may minimize a final objective function in which the correlation value has been subtracted from the objective function of the softmax. The second learning network model 200 may learn hidden layer information in which the correlation value is derived as a maximum value by minimizing the final objective function.

Figures 3, 4:
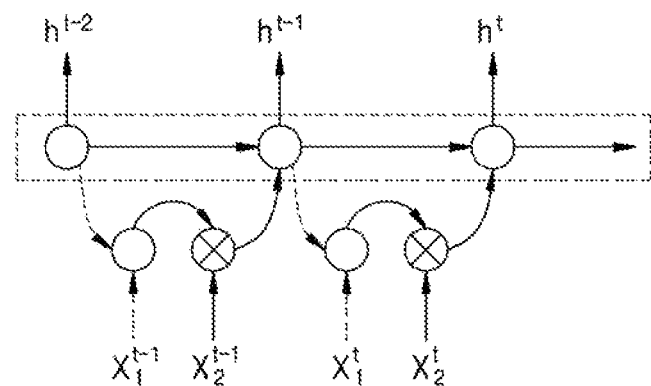
FIG. 3 is a view for explaining a method of obtaining context information by a context determiner, according to an embodiment.
FIG. 4 is a table comparing accuracy of data obtained by using a method of learning multi-modal data, according to an embodiment.

FIG. 3 is a view for explaining a method of obtaining context information at a context determiner according to an embodiment.

In an embodiment, the context determiner may process a different kind of domain vector signal in time sequence.

In an embodiment, the context determiner may control a flow of a different kind of domain vector signal to extract only meaningful information instead of using all information of a received different kind of domain vector signal.

In an embodiment, the context determiner may extract only meaningful information by controlling a flow of different kind of domain vector signals respectively including different modalities.

In an embodiment, the context determiner may receive hidden layer information and cross modality information of a previous time step. In an embodiment, the context determiner may use a neural network. In an embodiment, the context determiner may generate a mask vector having the same size as that of a vector of input modality information.

In an embodiment, the neural network may extract important information from input modality through elementwise multiplication of a mask vector having a value ranging from 0 to 1 and the input modality by using a sigmoid activation function, and transfer the extracted information to an upper layer, FIG. 4 is a table of comparing an accuracy of data obtained by using a method of learning multi-modal data according to an embodiment.

Referring to FIG. 4, an accuracy of a class of a different kind of domain vector signal finally determined depending on a combination of a learning network model is illustrated.

Specifically, FIG. 4 exemplarily illustrates that the number of preset classes of a method of learning multi-modal data is 233.

acc@top1 means that the number of classes of a different kind of domain vector finally determined is 1.

acc@top5 means that the number of classes of a different kind of domain vector finally determined is 5.

An accuracy of a class of a different kind of domain vector signal finally determined by using a baseline model that does not use the first learning network model 100 and the second learning network model 200 is 64.1% in the case of acc@top1, and is 86.8% in the case of acc@top5.

An accuracy of a class of a different kind of domain vector signal finally determined by using a CM_Joint model that uses only the second learning network model 200 is 68.5% in the case of acc@top1, and is 89% in the case of acc@top5.

An accuracy of a class of a different kind of domain vector signal finally determined by using a context flow control model that uses only the first learning network model 100 is 64.5% in the case of acc@top1, and is 88.5% in the case of acc@top5.

An accuracy of a class of a different kind of domain vector signal finally determined by using an overall framework model that uses both the first learning network model 100 and the second learning network model 200 is 69.0% in the case of acc@top1, and is 89.7% in the case of acc@top5.

As illustrated in FIG. 4, in the case of using the overall framework model that uses both the first learning network model 100 and the second learning network model 200, an accuracy of a class of a different kind of domain vector signal finally determined is highest.

Figure 5:
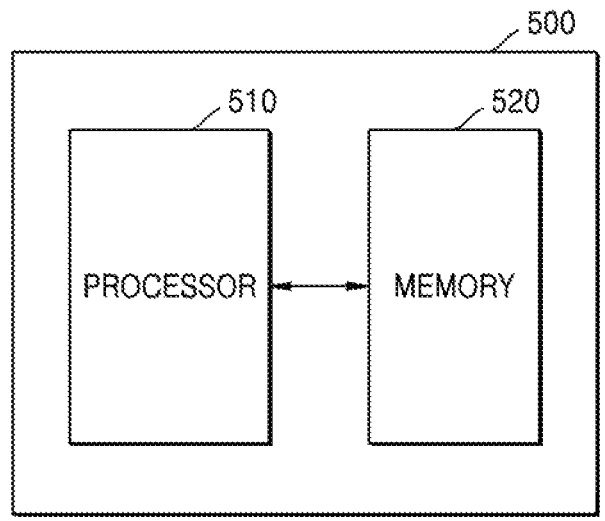
FIGS. 5 and 6 are block diagrams of an apparatus for learning multi-modal data, according to an embodiment.
Figure 6:
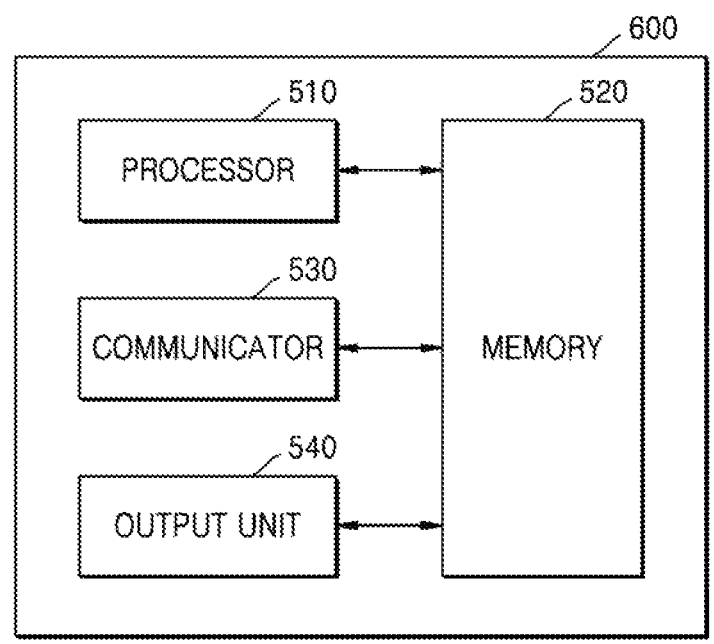

FIGS. 5 and 6 are block diagrams of an apparatus for learning multi-modal data according to an embodiment.

Referring to FIG. 5, an apparatus 500 for learning multi-modal data (referred to as an apparatus) may include a processor 510 and a memory 520. However, this is an embodiment. The apparatus 500 may include the number of elements less or greater than the number of elements including the processor 510 and the memory 520. For example, referring to FIG. 6, an apparatus 600 according to another embodiment may further include a communicator 530 and an output unit 540 in addition to the processor 510 and the memory 520. Also, according to another embodiment, the apparatus 500 may include a plurality of processors.

The processor 510 may include one or more cores (not shown) and a graphic processor (not shown) and/or a connection path (e.g. bus, etc.) configured to transmit/receive a signal to/from another element.

The processor 510 may include the one or more cores (not shown) and the graphic processor (not shown) and/or the connection path (e.g. bus, etc.) configured to transmit/receive a signal to/from another element.

In an embodiment, the processor 510 may perform an operation of the apparatus described above with reference to FIGS. 1 to 4.

For example, the processor 510 may obtain first context information representing a characteristic of a first signal and second context information representing a characteristic of a second signal by using the first learning network model.

The processor 510 may obtain hidden layer information based on the first context information and the second context information by using the second learning network model.

The processor 510 may obtain a correlation value representing a relation degree between hidden layer information by using the second learning network model.

Also, the processor 510 may learn hidden layer information in which the correlation value is derived as a maximum value.

The first signal and the second signal may respectively include different kinds of domain vectors.

In an embodiment, the processor 510 may obtain the first context information by element-wise multiplying the domain vector of the first signal by a mask vector having the same size as that of the domain vector of the first signal.

In an embodiment, the processor 510 may obtain the second context information by element-wise multiplying the domain vector of the second signal by a mask vector having the same size as that of the domain vector of the second signal.

In an embodiment, the processor 510 may use the second learning network model included in the LSTM.

The obtained hidden layer information may include hidden layer information of the first signal, hidden layer information of the second signal, and common hidden layer information of the first and second signals.

In an embodiment, the processor 510 may learn hidden layer information by repeating an operation of subtracting the correlation value from an objective function until the objective function of a softmax has a minimum value.

In an embodiment, the processor 510 may minimize a final objective function in which the correlation value has been subtracted from the objective function of the softmax. The second learning network model 200 may learn hidden layer information in which the correlation value is derived as a maximum value by minimizing the final objective function.

In an embodiment, the processor 510 may obtain a first correlation value representing a relation degree between the hidden layer information of the first signal and the common hidden layer information of the first and second signals, and a second correlation value representing a relation degree between the hidden layer information of the second signal and the common hidden layer information of the first and second signals.

Meanwhile, the processor 510 may further include a random access memory (RAM) (not shown) and a read-only memory (ROM) (not show) configured to temporarily and/or permanently store a signal (or data) processed inside the processor 510. Also, the processor 510 may be implemented as a system on chip (SoC) including at least one of a graphic processor, a RAM, and a ROM.

The memory 520 may store programs (one or more instructions) for a process and a control of the processor 510. The programs stored in the memory 520 may be divided to a plurality of modules depending on functions thereof. In an embodiment, a data learner and a data recognizer described below with reference to FIG. 7 may be configured as software modules of the memory 520. Also, the data learner and the data recognizer may independently include a learning network model, or share one learning network model.

The communicator 530 may include one or more elements for communication with an external server (e.g. a server 40 of FIG. 4) and other external apparatuses. For example, the communicator 530 may receive first context information representing a characteristic of a first signal and second context information representing a characteristic of a second signal from the server by using the first learning network model stored in the server. Also, the communicator 530 may receive hidden layer information based on the first context information and the second context information from the server by using the second learning network model stored in the server. Also, the communicator 530 may receive a correlation value representing a relation degree between the hidden layer information by using the second learning network model stored in the server.

The output unit 540 may receive each hidden layer information, aggregate a class mapped to a matched class, and finally output a class of a different kind of domain vector signal.

Meanwhile, the apparatus 500 may be, for example, a personal computer (PC), a laptop computer, a mobile phone, a micro server, a global positioning system (GPS) apparatus, a smartphone, a wearable terminal, an electronic book terminal, a home appliance, an electronic apparatus inside an automobile, and other mobile or non-mobile computing apparatus. However, the apparatus 500 is not limited thereto and may include all kinds of apparatuses having a data processing function.

Figure 7:
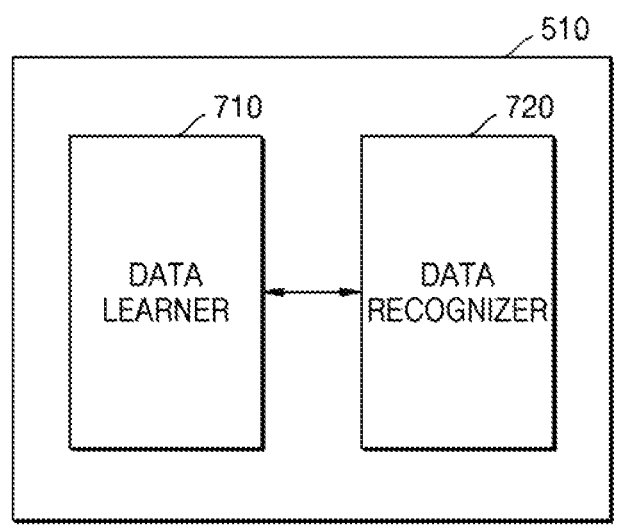
FIG. 7 is a view for explaining a processor according to an embodiment.

FIG. 7 is a view for explaining the processor 510 according to an embodiment.

Referring to FIG. 7, in an embodiment, the processor 510 may include a data learner 710 and a data recognizer 720.

The data learner 710 may learn a reference for obtaining context information representing a characteristic of a signal. For example, the data learner 710 may learn a reference for obtaining modality information of a time at which a change of a sequence signal constituting a different kind of domain vector signal is large. The data learner 710 may determine context information based on a value of element-wise multiplying the domain vector by a mask vector of the signal.

Also, the data learner 710 may learn a reference of obtaining hidden layer information based on the context information. The data learner 710 may obtain a correlation value between the hidden layer information to learn a reference of the hidden layer information in which the correlation value is derived as a maximum value.

The data recognizer 720 may recognize a class of a plurality of different kinds of domain vector signals based on a reference learned through the data learner 710.

At least one of the data learner 710 and the data recognizer 720 may be manufactured as at least one hardware chip and mounted on the apparatus for learning multi-modal data. For example, at least one of the data learner 710 and the data recognizer 720 may be manufactured as a hardware chip exclusively used for an AI, or manufactured as a portion of a general-purpose processor (e.g. a central processing unit (CPU) or an application processor) or a processor exclusively used for graphics (e.g. a graphic processing unit (GPU)) according to a related art, and mounted on various kinds of neural network learning apparatuses.

In this case, the data learner 710 and the data recognizer 720 may be mounted one apparatus for learning multi-modal data, or may be respectively mounted on separate apparatuses for learning multi-modal data. For example, one of the data learner 710 and the data recognizer 720 may be included in the apparatus, and the other may be included in the server. Also, the data learner 710 and the data recognizer 720 may provide model information established by the data learner 710 to the data recognizer 720, and may provide data input to the data recognizer 720 to the data learner 710 as additional learning data through a wired line or wirelessly.

Meanwhile, at least one of the data learner 710 and the data recognizer 720 may be implemented as a software module. In the case where at least one of the data learner 710 and the data recognizer 720 is implemented as a software module (or a program module including an instruction), the software module may be stored in a non-transitory computer readable recording medium. Also, in this case, the at least one software module may be provided by an operation system (OS), or provided by a preset application. Alternatively, some of the at least one software module may be provided by the OS, and the rest of the at least one software module may be provided by a preset application.

Figure 8:
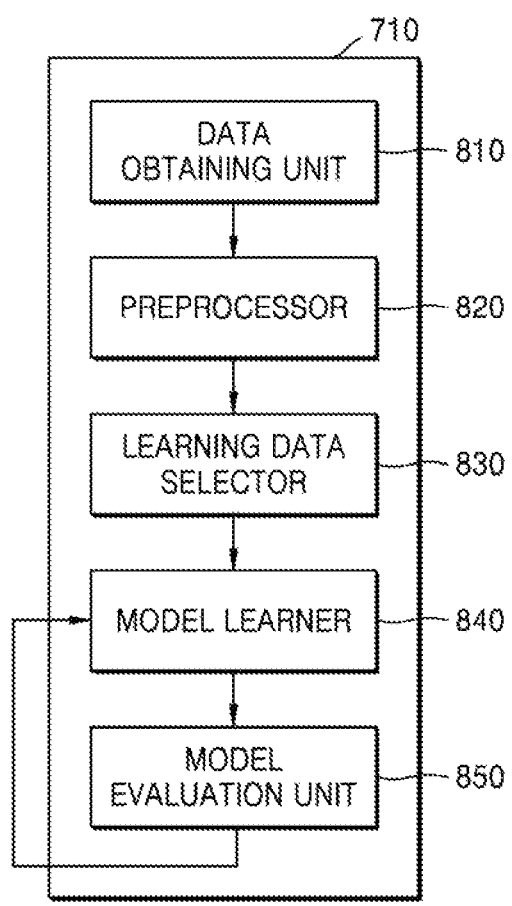
FIG. 8 is a block diagram of a data learner according to an embodiment.

FIG. 8 is a block diagram of the data learner 710 according to an embodiment.

Referring to FIG. 8, in an embodiment, the data learner 710 may include a data obtaining unit 810, a preprocessor 820, a learning data selector 830, a model learner 840, and a model evaluation unit 850. However, this is only an embodiment, and the data learner 710 may include the number of elements less than the number of above-described elements, or another element may be additionally included in the data learner 710 besides the above-described elements.

The data obtaining unit 810 may obtain as learning data, context information representing a characteristic of a different kind of domain signal. As an example, the data obtaining unit 810 may obtain context information representing characteristics of at least two different kinds of domain signals from the apparatus for learning multi-modal data including the data learner 710 or an external apparatus or server which may communicate with the apparatus for learning multi-modal data including the data learner 710.

Also, the data obtaining unit 810 may obtain multi-modal learning data from hidden layer information obtained from context information representing a characteristic of a different kind of domain signal by using the first learning network model and the second learning network model described with reference to FIGS. 1 to 4.

The preprocessor 820 may preprocess obtained context information and obtained hidden layer information such that the obtained context information and the obtained hidden layer information are used for learning multi-modal data. The preprocessor 820 may process the obtained context information and the obtained hidden layer information in a preset format such that the model learner 840 described below uses the obtained context information and the obtained hidden layer information for learning.

The learning data selector 830 may select context information and hidden layer information required for learning among preprocessed data. The selected context information and hidden layer information may be provided to the model learner 840. The learning data selector 830 may select context information and hidden layer information required for learning among preprocessed context information and hidden layer information according to a set reference.

The model learner 840 may obtain a correlation value or learn a reference as to whether an object inside an image is recognized by using certain information among context information and hidden layer information in a plurality of layers inside a learning network model. For example, the model learner 840 may learn a reference as to whether to generate additional learning context information and hidden layer information according to a certain reference based on an objective function of a softmax.

According to various embodiments, in the case where there are a plurality of data recognition models established in advance, the model learner 840 may determine a data recognition model in which a relation between input learning data and basic learning data is large as a data recognition model to be learned. In this case, the basic learning data may be classified in advance for each type of data, and the data recognition model may be established in advance for each type of data. For example, the basic learning data may be classified in advance based on various references such as an area in which learning data has been generated, time at which the learning data has been generated, a size of the learning data, a genre of the learning data, a generator of the learning data, and a kind of an object inside the learning data.

Also, the model learner 840 may learn a data generation model through, for example, reinforcement learning which uses feedback as to whether a class recognized through learning is correct.

Also, when the data generation model is learned, the model learner 840 may store the learned data generation model. In this case, the model learner 840 may store the learned data generation model in a memory of the apparatus for learning multi-modal data including the data obtaining unit 810. Alternatively, the model learner 840 may store the learned data generation model in a memory of the server connected to the apparatus for learning multi-modal data through a wired/wireless network.

In this case, the memory in which the learned data generation model is stored may store together a command (an instruction ?) or data related to at least one other element of, for example, a neural network learning apparatus. Also, the memory may store software and/or a program. The program may include, for example, kernel, middleware, an application programming interface (API) and/or an application program (or an "application").

The model evaluation unit 850 may input evaluation data to the data generation model. When a result of generation of additional learning data output from the evaluation data does not meet a preset reference, the model evaluation unit 850 may allow the model learner 840 to perform learning again. In this case, the evaluation data may be data set in advance for evaluating the data generation model.

Meanwhile, in the case where there are a plurality of learning network models, the model evaluation unit 850 may evaluate whether each of the learning network models meets the preset reference, and determine the learning network model meeting the preset reference as a final learning network model.

Meanwhile, at least one of the data obtaining unit 810, the preprocessor 820, the learning data selector 830, the model learner 840, and the model evaluation unit 850 inside the data learner 710 may be manufactured as at least one hardware chip and mounted on a neural network learning apparatus. For example, at least one of the data obtaining unit 810, the preprocessor 820, the learning data selector 830, the model learner 840, and the model evaluation unit 850 may be manufactured as a hardware chip exclusively used for an AI, or manufactured as a portion of a general-purpose processor (e.g. a CPU or an application processor) or a processor exclusively used for graphics (e.g. a GPU) according to a related art, and may be mounted on the above-described various kinds of neural network learning apparatuses.

Also, the data obtaining unit 810, the preprocessor 820, the learning data selector 830, the model learner 840, and the model evaluation unit 850 may be mounted on one apparatus for learning multi-modal data, or respectively mounted on separate apparatuses for learning multi-modal data. For example, some of the data obtaining unit 810, the preprocessor 820, the learning data selector 830, the model learner 840, and the model evaluation unit 850 may be included in the apparatus for learning multi-modal data, and the rest of them may be included in the server.

Also, at least one of the data obtaining unit 810, the preprocessor 820, the learning data selector 830, the model learner 840, and the model evaluation unit 850 may be implemented as a software module. In the case where at least one of the data obtaining unit 810, the preprocessor 820, the learning data selector 830, the model learner 840, and the model evaluation unit 850 is implemented as a software module (or a program module including an instruction), the software module may be stored in a non-transitory computer readable recording medium. Also, in this case, at least one software module may be provided by an OS, or provided by a preset application. Alternatively, some of the at least one software module may be provided by the OS, and the rest of the at least one software module may be provided by a preset application.

Figure 9:
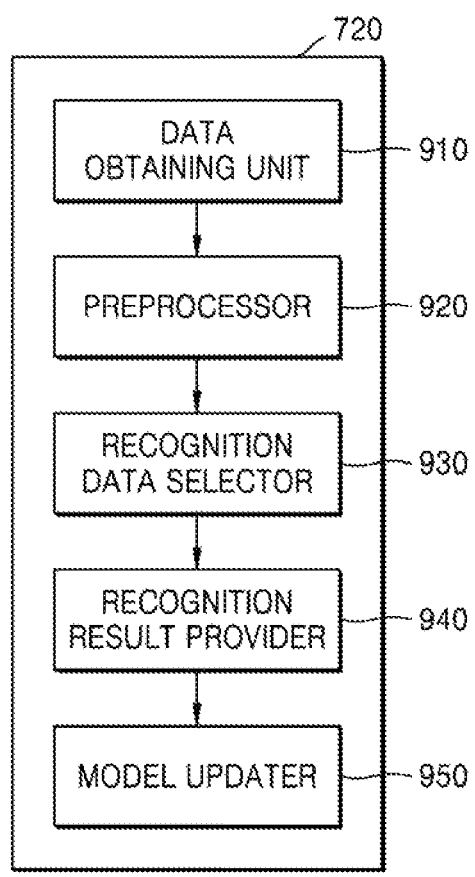
FIG. 9 is a block diagram of a data recognizer according to an embodiment.

FIG. 9 is a block diagram of the data recognizer 720 according to an embodiment.

Referring to FIG. 9, the data recognizer 720 may include a data obtaining unit 910, a preprocessor 920, a recognition data selector 930, a recognition result provider 940, and a model updater 950.

The data obtaining unit 910 may obtain context information representing characteristics of different kinds of domain signals, and the preprocessor 920 may preprocess the obtained context information and hidden layer information such that the obtained context information and hidden layer information are used for learning multi-modal data. The preprocessor 920 may process the obtained context information and hidden layer information in a preset format such that the recognition result provider 940 described below uses the obtained context information and hidden layer information. The recognition data selector 930 may select context information and hidden layer information required for characteristic extraction or class recognition among preprocessed data. The selected context information and hidden layer information may be provided to the recognition result provider 940.

The recognition result provider 940 may apply the selected context information and hidden layer information to a learning network model according to an embodiment to extract characteristic information of different kinds of domain signals, or recognize an object inside a different kind of domain signal. A method of inputting different kinds of domain signals to a learning network model to extract context information and hidden layer information, or recognize an object may correspond to the method described above with reference to FIGS. 1 to 4.

The recognition result provider 940 may provide a result of recognizing a class of an object included in a different kind of domain signal.

The model updater 950 may provide information regarding evaluation to the model learner 840 described above with reference to FIG. 8 such that an infrageneric classification network included in the learning network model or a parameter, etc. of at least one characteristic extraction layer is updated, based on the evaluation regarding a class recognition result of an object inside a different kind of domain signal provided by the recognition result provider 940.

Meanwhile, at least one of the data obtaining unit 910, the processor 920, the recognition data selector 930, the recognition result provider 940, and the model updater 950 inside the data recognizer 720 may be manufactured as at least one hardware chip and mounted on a neural network learning apparatus. For example, at least one of the data obtaining unit 910, the processor 920, the recognition data selector 930, the recognition result provider 940, and the model updater 950 may be manufactured as a hardware chip exclusively used for an AI, or manufactured as a portion of a general-purpose processor (e.g. a CPU or an application processor) or a processor exclusively used for graphics (e.g. a GPU) according to a related art, and may be mounted on the above-described various kinds of apparatuses for learning multi-modal data.

Also, the data obtaining unit 910, the processor 920, the recognition data selector 930, the recognition result provider 940, and the model updater 950 may be mounted on one apparatus for learning multi-modal data, or respectively mounted on separate apparatuses for learning multi-modal data. For example, some of the data obtaining unit 910, the processor 920, the recognition data selector 930, the recognition result provider 940, and the model updater 950 may be included in the apparatus for learning multi-modal data, and the rest of them may be included in the server.

Also, at least one of the data obtaining unit 910, the processor 920, the recognition data selector 930, the recognition result provider 940, and the model updater 950 may be implemented as a software module. In the case where at least one of the data obtaining unit 910, the processor 920, the recognition data selector 930, the recognition result provider 940, and the model updater 950 is implemented as a software module (or a program module including an instruction), the software module may be stored in a non-transitory computer readable recording medium. Also, in this case, at least one software module may be provided by an OS, or provided by a preset application. Alternatively, some of the at least one software module may be provided by the OS, and the rest of the at least one software module may be provided by a preset application.

Figure 10:
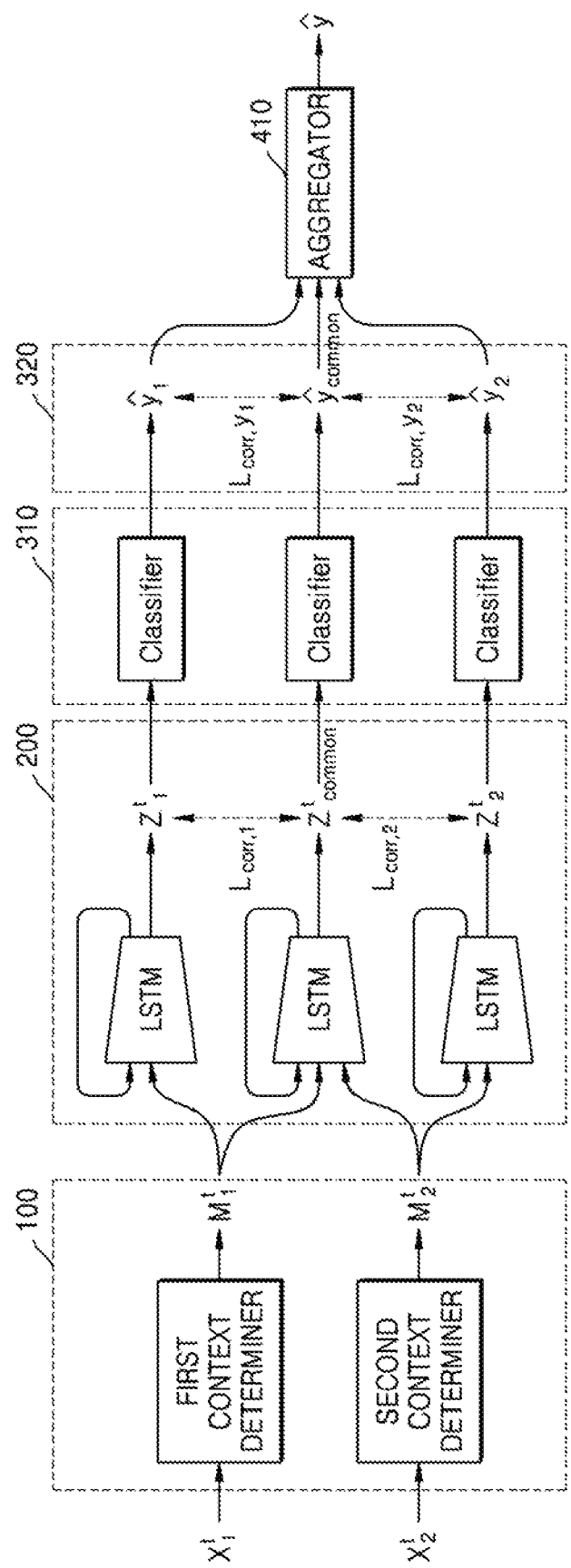
FIG. 10 is a conceptual view for explaining an apparatus for learning multi-modal data, according to an embodiment.

FIG. 10 is a conceptual view for explaining an apparatus for learning multi-modal data according to an embodiment.

Referring to FIG. 10, the apparatus for learning multi-modal data may include a first learning network model 100, a second learning network model 200, a classifier 310, a third learning network model 320, and an aggregator 410. The apparatus for learning multi-modal data illustrated in FIG. 10 is nearly the same as the apparatus for learning multi-modal data illustrated in FIG. 1, but the apparatus for learning multi-modal data illustrated in FIG. 10 is different from the apparatus for learning multi-modal data illustrated in FIG. 1 in that it includes three learning network models 100, 200, and 320 in total. Therefore, the same contents of descriptions of FIG. 10 as those described in FIG. 1 are omitted.

The apparatus for learning multi-modal data may receive different kinds of domain signals X1 and X2 and extract only important information inside each domain information through a context information adjusting module to perform modeling through a gated recurrent unit (GRU) or a contextual gated recurrent unit (cGRU).

Specifically, the first learning network model 100 may include a first context determiner and a second context determiner. The first context determiner and the second context determiner may respectively receive different kinds of domain vector signals X1 and X2.

Each of the first and second context determiners may include a context flow control model. The first context determiner may obtain first context information M1 representing a characteristic of the signal X1.

The first context determiner may generate a domain vector of the received signal X1 and a mask vector having the same size as that of the domain vector of the signal X1 and obtain the first context information M1 by element-wise multiplying the domain vector of the signal X1 by the mask vector of the signal X1.

The second context determiner may obtain second context information M2 representing a characteristic of the signal X2. The second context determiner may generate a domain vector of the received signal X2 and a mask vector having the same size as that of the domain vector of the signal X2 and obtain the second context information M2 by element-wise multiplying the domain vector of the signal X2 by the mask vector of the signal X2.

In an embodiment, context information may be determined as modality information determined as important information among modality information of a different kind of domain vector signal.

The second learning network model 200 may include three LSTM networks. The second learning network model 200 may receive the first context information M1 and the second context information M2 obtained by the first learning network model 100. The second learning network model 200 may obtain hidden layer information Z1, Zcommon, and Z2 based on the first context information M1 and the second context information M2 received by using the LSTM network.

The second learning network model 200 may obtain the hidden layer information Z1 based on the first context information M1, obtain the hidden layer information Z2 based on the second context information M2, and obtain the common hidden layer information Zcommon based on the first context information M1 and the second context information M2.

The second learning network model 200 may obtain a correlation value representing a relation degree between the obtained hidden layer information.

The second learning network model 200 may obtain a correlation value between the hidden layer information Z1 and the common hidden layer information Zcommon. The second learning network model 200 may obtain a correlation value between the hidden layer information Z2 and the common hidden layer information Zcommon.

The second learning network model 200 may learn hidden layer information in which a correlation value is derived as a maximum value.

The second learning network model 200 may learn hidden layer information in which the correlation value is derived as a maximum value by repeating an operation of subtracting the correlation value from an objective function until the objective function of the classifier 310 has a minimum value. In an embodiment, the second learning network model 200 may minimize a final objective function in which the correlation value has been subtracted from the objective function of the classifier 310. The second learning network model 200 may learn the hidden layer information in which the correlation value is derived as the maximum value by minimizing the final objective function.

The classifier 310 may include a softmax. In an embodiment, the classifier 310 may include three softmaxes in total.

The softmax may receive each hidden layer information and map the hidden layer information to a matched class.

The third learning network model 320 may add a correlation between result values predicted by the classifier 310 to the objective function to perform learning. In an embodiment, the third learning network model 320 may learn a correlation between Z1 and Z2, which are results learned by the LSTM of the second learning network model 200, and Zcommon which is the common hidden layer information to maximize a correlation between predictions in respective domains. Regarding a correlation in a Z-space learned by the third learning network model 320, when agreement of representation is performed, agreement of prediction may be performed on a correlation between predictions Z1, Zcommon, and Z2 in a domain.

The aggregator 410 may aggregate mapped classes to finally determine a class Y of a different kind of domain vector signal. In an embodiment, the aggregator 410 performs a main task by utilizing a plurality of obtained domain hidden layer information Z1 and Z2 and common hidden layer information Zcommon, and then aggregate classes by using adaptive aggregation to perform the main task.

In an embodiment illustrated in FIG. 10, the apparatus for learning multi-modal data may perform learning such that maximization of a correlation is possible by adding, to an objective function, a correlation between hidden layer information Z1 and Z2 and common hidden layer information of respective domains, and a correlation between learning results of respective domains, that is, predictions and common predictions, and performing learning. That is, the apparatus for learning multi-modal data may improve an accuracy of learning by simultaneously performing agreement of a representation space and prediction agreement.

Figures 11, 12:
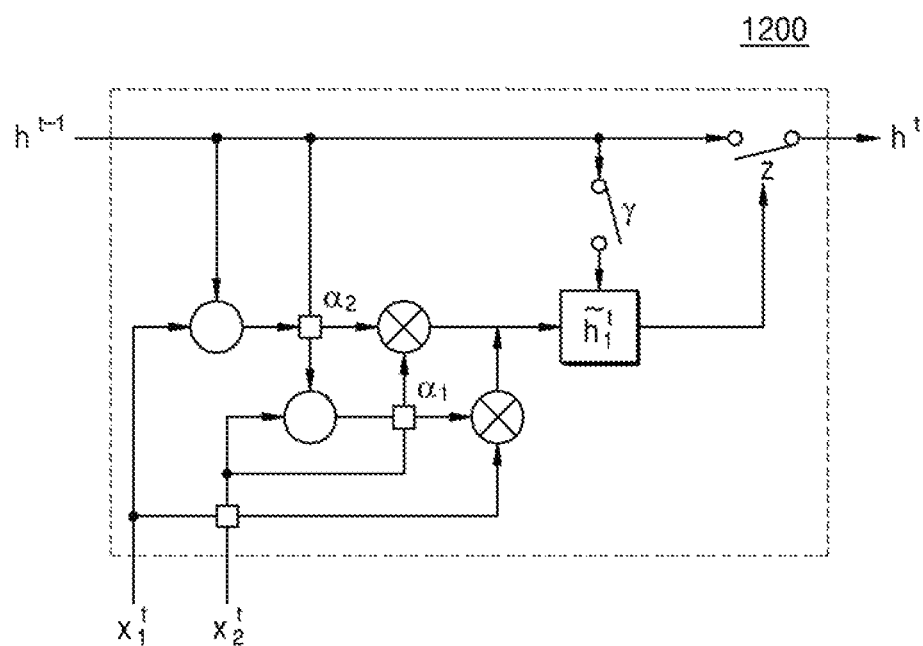
FIG. 11 is a table comparing accuracy of data obtained by using a method of learning multi-modal data, according to an embodiment.
FIG. 12 is a view illustrating a contextual gated recurrent unit (cGRU) performing multi-modal data learning, according to an embodiment.

FIG. 11 is a table of comparing an accuracy of data obtained by using a method of learning multi-modal data according to an embodiment.

Referring to FIG. 11, an accuracy of a class of a different kind of domain vector signal finally determined depending on a combination of learning network models is illustrated. Like the case of FIG. 4, a method of learning multi-modal data illustrated in FIG. 11 exemplarily illustrates that the number of classes is 233. All of a Corr_Hidden model, a Corr_Logit model, and a Corr_HiddenLogit model aggregate classes through adaptive aggregation.

acc@top1 denotes that the number of classes of a different kind of domain vector signal finally determined is 1. acc@top5 denotes that the number of classes of a different kind of domain vector signal finally determined is 5.

An accuracy of a class of a different kind of domain vector signal finally determined by using a baseline model which does not use the first learning network model 100 and the second learning network model 200 is 64.1% in the case of acc@top1 and is 86.8% in the case of acc@top5.

In the case of performing learning by using the first learning network model 100 and the second learning network model 200 illustrated in FIG. 1, an accuracy of a class of a different kind of domain vector signal finally determined is 71.79% in the case of acc@top1 and is 90.78% in the case of acc@top5.

An accuracy of a class of a different kind of domain vector signal finally determined by using the Corr_Logit model is 71.64% in the case of acc@top1 and is 90.55% in the case of acc@top5, the Corr_Logit model not using the first learning network model 100 and the second learning network model 200, but using only the third learning network model 320 illustrated in FIG. 10.

An accuracy of a class of a different kind of domain vector signal finally determined by using the Corr_HiddenLogit model (the embodiment illustrated in FIG. 10) is 71.80% in the case of acc@top1 and is 90.79% in the case of acc@top5, the Corr_HiddenLogit model using all of the first learning network model 100, the second learning network model 200, and the third learning network model 320.

Referring to a table of FIG. 11, an accuracy of a result learned in each domain and predicted through the classifier 310 (see FIG. 10), that is, an accuracy of data Corr_HiddenLogit output by additionally learning a correlation through the third learning network model 320 with respect to Z1, Z2, and Zcommon is highest. This means that Corr_HiddenLogit improves performance by simultaneously performing agreement of a representation space and prediction agreement.

FIG. 12 is a view illustrating a contextual gated recurrent unit (cGRU) 1200 performing multi-modal data learning, according to an embodiment.

Referring to FIG. 12, the cGRU 1200 may model a contextual flow between domains through a cross-guided flow control. Respective parameters of the cGRU 1200 may be calculated through Equation 1 below.

$$\alpha_1 = \sigma(W_{\alpha 1 h} h^{i-1} + W_{\alpha 1 x} x_1^i + b_{\alpha 1}) \quad [\text{Equation 1}]$$

$$\alpha_2 = \sigma(W_{\alpha 2 h} h^{i-1} + W_{\alpha 2 x} x_2^i + b_{\alpha 2})$$

$$x^i = \lfloor \alpha_1 \odot x_1^i; \alpha_2 \odot x_2^i \rfloor$$

$$z^i = \sigma(W_{zh} h^{i-1} + W_{zx} x^i + b_z)$$

$$r^i = \sigma(W_{rh} h^{i-1} + W_{rx} x^i + b_r)$$

$$\tilde{h}^i = \tanh(W_{hx} x^i + W_{hh}(r^i \odot h^{i-1}) + b_h)$$

$$h^i = (1 - z^i) \odot h^{i-1} + z^i \odot \tilde{h}^i$$

Unlike the LSTM, contextual flow control modeling using the cGRU 1200 is sequential modeling based on a flow control, not a memory control, and may describe a contextual flow of a plurality of domains by exchanging cross-guided information between domains.

In an embodiment, the apparatus for learning multi-modal data may control an information flow between domains through the cGRU 1200 and emphasize an input of an important time to perform common representation modeling.

FIG. 13 is a table of comparing data accuracies of a case of using a cGRU according to an embodiment and a case of not using the cGRU. Like FIGS. 4 and 11, FIG. 13 exemplarily illustrates that the number of preset classes of a method of learning multi-modal data is 233.

Referring to FIG. 13, an accuracy of a class of a different kind of domain vector signal determined through an apparatus for learning multi-modal data using a cGRU is 73.92% in the case of acc@top1, and is 92.02% in the case of acc@top5.

An accuracy of a class of a different kind of domain vector signal determined through the apparatus for learning multi-modal data not using a cGRU is 71.90% in the case of acc@top1, and is 90.79% in the case of acc@top5.

A cGRU may be used for a model, which is contextual flow modeling using a cGRU, corresponding to common representation, and a GRU may be used for a model corresponding to each domain specific representation.

The apparatus for learning multi-modal data may control an information flow between domains through a cGRU, and emphasize an input of an important time to perform common representation modeling.

FIG. 14 is a table of comparing an accuracy of data obtained by using a method of learning multi-modal data according to an embodiment. The table shown in FIG. 14 measures performance of a model regarding fudan-columbia video dataset (FCVID) which is moving image classification data.

Referring to FIG. 14, an accuracy of a class of a different kind of domain vector signal finally determined depending on a combination of learning network models is illustrated. Like the cases of FIGS. 4, 11, and 13, a method of learning multi-modal data illustrated in FIG. 14 exemplarily illustrates that the number of classes is 233.

acc@top1 denotes that the number of classes of a different kind of domain vector signal finally determined is 1, acc@top5 denotes that the number of classes of a different kind of domain vector signal finally determined is 5.

An accuracy of a class of a different kind of domain vector signal finally determined by using a baseline model which does not use the first learning network model 100 (see FIG. 1) and the second learning network model 200 (see FIG. 1) is 64.1% in the case of acc@top1, and is 86.8% in the case of acc@top5.

In the case of performing learning by using a Corr_Base model which does not obtain hidden layer information, an accuracy of a class of a different kind of domain vector signal finally determined is 66.29% in the case of acc@top1, and is 88.04% in the case of acc@top5.

In the case of performing learning through Corr_Hidden, which is a learning model obtaining hidden layer information and using mean aggregation, an accuracy of a class of a different kind of domain vector signal finally determined is 68.5% in the case of acc@top1, and is 89% in the case of acc@top5.

In the case of performing learning through projective aggregation, which is a learning model obtaining hidden layer information and using projective aggregation, an accuracy of a class of a different kind of domain vector signal finally determined is 70.47% in the case of acc@top1, and is 89.5% in the case of acc@top5.

In the case of an adaptive aggregation model which performs learning by using the first learning network model 100 and the second learning network model 200 illustrated in FIG. 1, an accuracy of a class of a different kind of domain vector signal finally determined is 71.79% in the case of acc@top1, and is 90.78% in the case of acc@top5.

In the case of a Corr_Logit model which does not use the first learning network model 100 (see FIG. 10) and the second learning network model 200 (see FIG. 10) and only uses the third learning network model illustrated in FIG. 10, an accuracy of a class of a different kind of domain vector signal finally determined is 71.64% in the case of acc@top1, and is 90.55% in the case of acc@top5.

In the case of a Corr_HiddenLogit model, which uses all of learning network model 100 (see FIG. 10), the second learning network model 200 (see FIG. 10), and the third learning network model 320 (see FIG. 10), an accuracy of a class of a different kind of domain vector signal finally determined is 71.78% in the case of acc@top1, and is 90.79% in the case of acc@top5.

In the table shown in FIG. 14, all of Base line, Corr_Base, Corr_Hidden, Projective Aggregation, Adaptive Aggregation, Corr_Logit, and Corr_HiddenLogit show results learned through sequential modeling by using the LSTM network. In the table of FIG. 14, in the case of using all of the first learning network model 100, the second learning network model 200, and the third learning network model 320 (see FIG. 10), and performing learning by using a cGRU or a GRU instead of the LSTM network, an accuracy of a model (Final) which learns a correlation of a different kind of domain vector signal is highest. That is, in the case of Final, an accuracy of a class of a different kind of domain vector signal finally determined is 73.92% in the case of acc@top1, and is 92.02% in the case of acc@top5.

Referring to FIG. 14, an accuracy of output data (the case of Final) is highest, the case of Final obtaining hidden layer information in each domain by using the cGRU/GRU and additionally learning a correlation through the third learning network model 320 (see FIG. 10) with respect to Z1, Z2, and Zcommon which are predictions through the hidden layer information.

Meanwhile, the embodiments can be written as computer programs and can be implemented in general-use digital computers that execute the programs using a computer readable recording medium.

Examples of the computer readable recording medium include magnetic storage media (e.g., ROM, floppy disks, hard disks, etc.), optical recording media (e.g., CD-ROMs, or DVDs), etc.

While one or more embodiments have been described with reference to the figures, it will be understood by those of ordinary skill in the art that various changes in form and details may be made therein without departing from the spirit and scope as defined by the following claims. Therefore, the embodiments should be considered in a descriptive sense only and for purposes of limitation.

The invention claimed is:

1. A method of learning multi-modal data, the method comprising:
    obtaining first context information representing a characteristic of a first signal and second context information representing a characteristic of a second signal by using a first learning network model;
    obtaining hidden layer information based on the first context information and the second context information by using a second learning network model;
    obtaining a correlation value representing a relation degree between the hidden layer information by using the second learning network model; and
    learning the hidden layer information in which the correlation value is derived as a maximum value,
    wherein the first context information is obtained by element-wise multiplying a domain vector of the first signal by a mask vector having the same size as that of the domain vector of the first signal, and the second context information is obtained by element-wise multiplying a domain vector of the second signal by a mask vector having the same size as that of the domain vector of the second signal.

2. The method of claim 1, wherein the first signal and the second signal respectively comprise different kinds of domain vectors.

3. The method of claim 1, wherein the second learning network model uses a long-short term memory (LSTM), and the obtained hidden layer information comprises hidden layer information of the first signal, hidden layer information of the second signal, and common hidden layer information of the first signal and the second signal.

4. The method of claim 1, wherein the learning of the hidden layer information comprises repeating an operation of subtracting the correlation value from an objective function until the objective function has a minimum value.

5. The method of claim 3, wherein the correlation value comprises a first correlation value representing a relation degree between the hidden layer information of the first signal and the common hidden layer information of the first signal and the second signal, and a second correlation value representing a relation degree between the hidden layer information of the second signal and the common hidden layer information of the first signal and the second signal.

6. An apparatus for learning multi-modal data, the apparatus comprising:
a memory storing one or more instructions; and
at least one processor configured to execute the one or more instructions stored in the memory to:
obtain first context information representing a characteristic of a first signal and second context information representing a characteristic of a second signal by using a first learning network model,
obtain hidden layer information based on the first context information and the second context information by using a second learning network model,
obtain a correlation value representing a relation degree between the hidden layer information by using the second learning network model, and
learn the hidden layer information in which the correlation value is derived as a maximum value,
wherein the first context information is obtained by element-wise multiplying a domain vector of the first signal by a mask vector having the same size as that of the domain vector of the first signal, and the second context information is obtained by element-wise multiplying a domain vector of the second signal by a mask vector having the same size as that of the domain vector of the second signal.

7. The apparatus of claim 6, wherein the first signal and the second signal respectively comprise different kinds of domain vectors.

8. The apparatus of claim 6, wherein the second learning network model uses a long-short term memory (LSTM), and the obtained hidden layer information comprises hidden layer information of the first signal, hidden layer information of the second signal, and common hidden layer information of the first signal and the second signal.

9. The apparatus of claim 6, wherein the at least one processor learns the hidden layer information by repeating an operation of subtracting the correlation value from an objective function until the objective function has a minimum value.

10. The apparatus of claim 8, wherein the correlation value comprises a first correlation value representing a relation degree between the hidden layer information of the first signal and the common hidden layer information of the first signal and the second signal, and a second correlation value representing a relation degree between the hidden layer information of the second signal and the common hidden layer information of the first signal and the second signal.

11. A non-transitory computer-readable recording medium having recorded thereon a program for executing the method of claim 1 on a computer.

* * * * *